(12) United States Patent
Tola

(10) Patent No.: US 12,026,283 B2
(45) Date of Patent: *Jul. 2, 2024

(54) UNOBTRUSIVE SYSTEMS AND METHODS FOR COLLECTING, PROCESSING AND SECURING INFORMATION TRANSMITTED OVER A NETWORK

(71) Applicant: Data Trendz LLC, Boulder, CO (US)

(72) Inventor: Kenneth Tola, Boulder, CO (US)

(73) Assignee: DataTrendz, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,803

(22) Filed: Jul. 10, 2023

(65) Prior Publication Data
US 2023/0351047 A1 Nov. 2, 2023

Related U.S. Application Data

(63) Continuation of application No. 17/544,459, filed on Dec. 7, 2021, now Pat. No. 11,698,991, which is a continuation of application No. 16/397,998, filed on Apr. 29, 2019, now Pat. No. 11,194,930.

(60) Provisional application No. 62/663,838, filed on Apr. 27, 2018.

(51) Int. Cl.
| | | |
|---|---|---|
| G06F 15/173 | (2006.01) | |
| G06F 16/955 | (2019.01) | |
| G06F 21/62 | (2013.01) | |
| H04L 67/146 | (2022.01) | |

(52) U.S. Cl.
CPC ...... *G06F 21/6254* (2013.01); *G06F 16/9566* (2019.01); *G06F 21/6263* (2013.01); *H04L 67/146* (2013.01)

(58) Field of Classification Search
None
See application file for complete search history.

(56) References Cited

U.S. PATENT DOCUMENTS

| | | |
|---|---|---|
| 5,317,571 A | 5/1994 | Marcel |
| 5,941,957 A | 8/1999 | Ingrassia et al. |
| 6,018,619 A | 1/2000 | Allard et al. |
| 6,052,730 A | 4/2000 | Felciano et al. |
| 6,131,163 A | 10/2000 | Wiegel |
| 6,212,574 B1 | 4/2001 | O'Rourke et al. |
| 6,408,061 B1 | 6/2002 | Donak et al. |
| 6,636,855 B2 | 10/2003 | Holloway et al. |
| 6,687,792 B2 | 2/2004 | Beyda |
| 6,690,678 B1 | 2/2004 | Basso |

(Continued)

OTHER PUBLICATIONS

Non-Final Office Action from U.S. Appl. No. 16/036,092, filed Jul. 29, 2019.

(Continued)

*Primary Examiner* — Phuoc H Nguyen
(74) *Attorney, Agent, or Firm* — FisherBroyles LLP; Ian R. Walsworth

(57) ABSTRACT

The present disclosure relates to methods for "cookieless" tracking across a wide range of websites and mobile applications. The methods do not involve the use of cookies or code on individual webs pages, and associated web or other servers and may be achieved through use of a single URL for tracking a user across multiple websites. Methods of enhanced tracking of user activity without requiring tracking pixels are also described herein.

14 Claims, 5 Drawing Sheets

(56) References Cited

U.S. PATENT DOCUMENTS

| | | | |
|---|---|---|---|
| 6,701,437 B1 | 3/2004 | Hoke |
| 6,728,767 B1 | 4/2004 | Day et al. |
| 6,850,986 B1 | 2/2005 | Peacock |
| 6,877,007 B1 | 4/2005 | Hentzel et al. |
| 6,976,003 B1 | 12/2005 | Hamor et al. |
| 7,003,565 B2 | 2/2006 | Hind |
| 7,020,719 B1 | 3/2006 | Grove et al. |
| 7,024,477 B2 | 4/2006 | Allan |
| 7,080,158 B1 | 7/2006 | Squire |
| 7,085,817 B1 | 8/2006 | Tock et al. |
| 7,293,095 B2 | 11/2007 | Gbadegesin |
| 7,376,722 B1 | 5/2008 | Sim et al. |
| 7,398,503 B2 | 7/2008 | Teig |
| 7,464,187 B2 | 12/2008 | Glommen et al. |
| 7,467,399 B2 | 12/2008 | Nadalin |
| 7,562,153 B2 | 7/2009 | Biliris et al. |
| 7,734,722 B2 | 6/2010 | Seidl et al. |
| 7,777,651 B2 | 8/2010 | Fallon et al. |
| 7,856,012 B2 | 12/2010 | Smith |
| 7,865,717 B2 | 1/2011 | Calcev |
| 8,019,884 B2 | 9/2011 | Manning et al. |
| 8,020,201 B2 | 9/2011 | Adusumilli et al. |
| 8,352,729 B2 | 1/2013 | Manning |
| 8,683,572 B1 | 3/2014 | Mahalingaiah |
| 8,738,656 B2 | 5/2014 | Kirshenbaum |
| 8,793,679 B2 | 7/2014 | Hillier |
| 8,856,869 B1 * | 10/2014 | Brinskelle ........... H04L 63/0823 726/2 |
| 9,075,990 B1 | 7/2015 | Yang |
| 9,130,960 B2 | 9/2015 | Osterling |
| 9,325,676 B2 | 4/2016 | Tola |
| 9,348,927 B2 | 5/2016 | Tola, Jr. |
| 9,391,832 B1 | 7/2016 | Song |
| 9,521,118 B2 * | 12/2016 | Cottrell ............... H04L 63/0281 |
| 9,531,703 B2 | 12/2016 | Schwartz |
| 9,716,589 B2 | 7/2017 | Johnson |
| 9,769,335 B2 | 9/2017 | Umeda |
| 11,410,179 B2 * | 8/2022 | Eisen ..................... G06F 21/44 |
| 11,514,492 B1 | 11/2022 | Panwar |
| 11,922,423 B2 * | 3/2024 | Eisen ................. G06Q 20/4016 |
| 2001/0032259 A1 | 10/2001 | Herrmann et al. |
| 2002/0024931 A1 | 2/2002 | Chikazawa |
| 2003/0050920 A1 | 3/2003 | Sun |
| 2003/0051026 A1 | 3/2003 | Carter |
| 2003/0101253 A1 | 5/2003 | Saito |
| 2003/0126248 A1 | 7/2003 | Chambers |
| 2003/0154448 A1 | 8/2003 | Teig |
| 2003/0204717 A1 | 10/2003 | Kuehnel |
| 2004/0103205 A1 | 5/2004 | Larson et al. |
| 2004/0111492 A1 | 6/2004 | Nakahara et al. |
| 2005/0015510 A1 | 1/2005 | Rhee |
| 2005/0108568 A1 | 5/2005 | Bussiere |
| 2005/0144242 A1 | 6/2005 | Marston et al. |
| 2005/0228780 A1 | 10/2005 | Diab et al. |
| 2005/0272405 A1 | 12/2005 | Tomlinson et al. |
| 2006/0029062 A1 | 2/2006 | Rao et al. |
| 2006/0037072 A1 | 2/2006 | Rao et al. |
| 2006/0085528 A1 | 4/2006 | Thomas |
| 2006/0093135 A1 | 5/2006 | Fiatal et al. |
| 2006/0123226 A1 | 6/2006 | Kumar et al. |
| 2006/0200660 A1 | 9/2006 | Woods |
| 2006/0227773 A1 | 10/2006 | Grewal |
| 2006/0293969 A1 | 12/2006 | Barger |
| 2007/0011146 A1 | 1/2007 | Holbrook |
| 2007/0011272 A1 | 1/2007 | Bakke et al. |
| 2007/0091927 A1 | 4/2007 | Apostolopoulos |
| 2007/0150075 A1 | 6/2007 | Dumas |
| 2007/0165625 A1 | 7/2007 | Eisner |
| 2007/0245409 A1 * | 10/2007 | Harris ..................... H04L 67/06 726/5 |
| 2007/0253427 A1 | 11/2007 | Stirbu |
| 2007/0291780 A1 | 12/2007 | Smith |
| 2007/0300290 A1 | 12/2007 | Shay |
| 2008/0027809 A1 | 1/2008 | Storm |
| 2008/0034416 A1 | 2/2008 | Kumar et al. |
| 2008/0270417 A1 | 10/2008 | Roker |
| 2008/0279198 A1 | 11/2008 | Gruber |
| 2008/0281900 A1 | 11/2008 | Boulia |
| 2008/0304518 A1 | 12/2008 | Cheng |
| 2008/0306815 A1 | 12/2008 | Dykes |
| 2009/0006612 A1 | 1/2009 | Asai |
| 2009/0013089 A1 | 1/2009 | Sullivan et al. |
| 2009/0070771 A1 | 3/2009 | Yuyitung |
| 2009/0083415 A1 | 3/2009 | Tola et al. |
| 2009/0119752 A1 | 5/2009 | Chandrashekhar et al. |
| 2009/0144818 A1 | 6/2009 | Kumar |
| 2009/0157883 A1 | 6/2009 | Maffeis |
| 2009/0172802 A1 | 7/2009 | Mosek et al. |
| 2009/0177761 A1 | 7/2009 | Meyer et al. |
| 2009/0182803 A1 | 7/2009 | Barton et al. |
| 2009/0193129 A1 | 7/2009 | Agarwal |
| 2009/0249467 A1 | 10/2009 | Webb-Johnson |
| 2009/0259666 A1 | 10/2009 | Tola et al. |
| 2009/0296685 A1 | 12/2009 | O'Shea et al. |
| 2009/0313290 A1 | 12/2009 | Narayanan et al. |
| 2009/0319661 A1 | 12/2009 | Shiozawa |
| 2010/0005194 A1 | 1/2010 | Perkins et al. |
| 2010/0031019 A1 | 2/2010 | Manning et al. |
| 2010/0064234 A1 * | 3/2010 | Schreiber ................ G06F 9/454 715/760 |
| 2010/0064340 A1 | 3/2010 | McCorkendale et al. |
| 2010/0142560 A1 | 6/2010 | Sharivker |
| 2010/0162235 A1 | 6/2010 | Ginzton et al. |
| 2010/0169508 A1 | 7/2010 | Jung |
| 2010/0175122 A1 | 7/2010 | Ballard |
| 2010/0192197 A1 | 7/2010 | Nadalin et al. |
| 2010/0226256 A1 | 9/2010 | Kato et al. |
| 2010/0268782 A1 | 10/2010 | Zombek et al. |
| 2011/0016197 A1 | 1/2011 | Shiimori et al. |
| 2011/0075845 A1 | 3/2011 | Calcev et al. |
| 2011/0106518 A1 | 5/2011 | Shin |
| 2011/0119376 A1 | 5/2011 | Bardsley et al. |
| 2011/0138069 A1 | 6/2011 | Momchilov et al. |
| 2011/0154018 A1 | 6/2011 | Edstrom |
| 2011/0154026 A1 | 6/2011 | Edstrom et al. |
| 2011/0209199 A1 | 8/2011 | Fenton et al. |
| 2011/0214131 A1 | 9/2011 | Luna |
| 2011/0216680 A1 | 9/2011 | Vogt et al. |
| 2011/0219057 A1 | 9/2011 | Scoda |
| 2011/0225646 A1 | 9/2011 | Crawford |
| 2011/0231479 A1 | 9/2011 | Boydstun et al. |
| 2011/0231555 A1 | 9/2011 | Ebrahimi et al. |
| 2011/0231652 A1 | 9/2011 | Bollay et al. |
| 2011/0231923 A1 | 9/2011 | Bollay et al. |
| 2011/0243024 A1 | 10/2011 | Osterling |
| 2011/0282997 A1 | 11/2011 | Prince et al. |
| 2011/0296196 A1 | 12/2011 | Konetski et al. |
| 2012/0011098 A1 | 1/2012 | Yamada |
| 2012/0047180 A1 | 2/2012 | Kirshenbaum |
| 2012/0084487 A1 | 4/2012 | Barde |
| 2012/0124641 A1 | 5/2012 | Hegge et al. |
| 2012/0246126 A1 | 9/2012 | Rodriguez |
| 2012/0284712 A1 | 11/2012 | Nimmagadda et al. |
| 2013/0058250 A1 | 3/2013 | Casado |
| 2013/0133043 A1 | 5/2013 | Barkie |
| 2013/0227165 A1 | 8/2013 | Liu |
| 2013/0232263 A1 | 9/2013 | Kelly |
| 2013/0297703 A1 | 11/2013 | Van Ackere |
| 2013/0298235 A1 | 11/2013 | Smith |
| 2013/0298236 A1 | 11/2013 | Smith et al. |
| 2013/0318339 A1 | 11/2013 | Tola et al. |
| 2014/0003434 A1 | 1/2014 | Assarpour et al. |
| 2014/0089460 A1 | 3/2014 | Tola |
| 2014/0317405 A1 | 10/2014 | Johnson |
| 2015/0081868 A1 | 3/2015 | Hillier |
| 2015/0135178 A1 | 5/2015 | Fischer |
| 2015/0172108 A1 | 6/2015 | Song |
| 2015/0365546 A1 | 12/2015 | Umeda |

OTHER PUBLICATIONS

Non-Final Office Action from U.S. Appl. No. 15/445,674, filed Dec. 18, 2017.

(56) References Cited

OTHER PUBLICATIONS

Final Office Action from U.S. Appl. No. 15/445,674, filed May 18, 2018.
Non-Final Office Action from U.S. Appl. No. 13/301,398, filed Aug. 23, 2012.
Final Office Action from U.S. Appl. No. 13/301,398, filed Mar. 12, 2013.
Non-Final Office Action from U.S. Appl. No. 12/148,286, filed Jul. 23, 2009.
Final Office Action from U.S. Appl. No. 12/148,286, filed Jan. 10, 2011.
Non-Final Office Action from U.S. Appl. No. 14/031,880, filed Apr. 15, 2015.
Final Office Action from U.S. Appl. No. 14/031,880, filed Aug. 5, 2015.
Non-Final Office Action from U.S. Appl. No. 12/103,619, filed Sep. 30, 2019.
Final Office Action from U.S. Appl. No. 12/103,619, filed Jun. 8, 2010.
Non-Final Office Action from U.S. Appl. No. 12/103,619, filed May 20, 2014.
Non-Final Office Action from U.S. Appl. No. 17/544,459, filed Dec. 8, 2022.
Johns, Martin, Sabelfeld, Andrei, Meier, Jan, Gollmann, Dieter, SessionSafe: Implementing XSS Immune Session Handling, 2006, Springer Berlin / Heidelber, p. 444-460.
Wessels, Web Caching, Chapter 5—Interception Proxying and Caching, O'Reilly Online Catalog, Jun. 2001.
U.S. Appl. No. 16/397,998, filed Apr. 29, 2019.
U.S. Appl. No. 16/503,054, filed Jul. 3, 2019.
U.S. Appl. No. 16/036,092, filed Jul. 16, 2018.
U.S. Appl. No. 15/445,674, filed Feb. 28, 2017.
U.S. Appl. No. 13/301,398, filed Nov. 21, 2011.
U.S. Appl. No. 12/148,286, filed Apr. 17, 2008.
U.S. Appl. No. 14/031,880, filed Sep. 19, 2013.
U.S. Appl. No. 12/103,619, filed Apr. 15, 2008.

* cited by examiner

UNOBTRUSIVE SYSTEMS AND METHODS FOR COLLECTING, PROCESSING AND SECURING INFORMATION TRANSMITTED OVER A NETWORK

CROSS-REFERENCE TO RELATED APPLICATIONS

This application is a continuation of U.S. patent application Ser. No. 17/544,459 filed on Dec. 7, 2021 and issued on Jul. 11, 2023 as U.S. Pat. No. 11,698,991, which is a continuation of U.S. patent application Ser. No. 16/397,998 filed on Apr. 29, 2019 and issued on Dec. 7, 2021 as U.S. Pat. No. 11,194,930, which in turn claims the benefit of U.S. Provisional Application No. 62/663,838, filed Apr. 27, 2018, which are all incorporated herein by reference in their entireties, including appendices to the same. U.S. patent application Ser. No. 15/445,674, filed Feb. 28, 2017, Ser. No. 16/036,092, filed Jul. 16, 2018, and Ser. No. 16/503,054, filed Jul. 3, 2019, are commonly owned by the same applicant and related to the present application, and are each incorporated by reference herein in their entireties for the purpose of supplementing this disclosure.

FIELD OF THE DISCLOSURE

The present disclosure relates generally to systems and methods for collecting information transmitted over a network, and specifically to a GDPR-compliant system and method of tracking network information.

BACKGROUND

Data collection solutions can generally be separated into two general approaches. The first approach, called server-side, loads software onto the customer's server such as, for example, packet "sniffing" software and log file analysis software. This software collects many of the more common usage statistics and is very beneficial in storing the method used to transmit data. The second approach focuses on placing code on the client's computer to capture client interactions with a remote site. These client-side data collection solutions take a variety of forms. Examples of client-side data collection solutions include code inserted on a page and text files (also known as "cookies") which are stored on the client's machine.

Unfortunately, both approaches suffer a number of drawbacks that make them non-viable options for comprehensive, unobtrusive data collection. One major drawback of these approaches is that code has to be installed either on the customer's server, in the former case, or on the client's machine as in the latter case. For example, in the case of website tracking, the only means available for these types of tracking system to persist across multiple websites is to utilize third-party cookies. Modern web browsers deny the ability to use such cookies by default, and new regulations effectively prohibit the use of these cookies because of strict requirements or severe fines and penalties.

Recent regulations and restrictions further complicate the use of cookies in prior art tracking systems and methods. For example, the European Union (EU) General Data Protection Regulation (GDPR), Regulation (EU) 2016/679, is a sweeping regulation on data protection and privacy for all individuals (called "data subjects" in the regulations) within the EU, and all personal data processed by any organization that is established in the EU. The GDPR also addresses the export of personal data outside the EU. The primarily aims of the GDPR are to give individuals control of their personal data and to simplify the regulatory environment for international business by unifying the regulation within the EU member states. The GDPR was enacted on Apr. 27, 2016 and became effective on May 25, 2018.

The GDPR requires organizations and businesses to take adequate measures to safeguard the personal data of individuals who come into contact with the organization, such as individual consumers. While the GDPR expands the rights of individuals (including non-citizens) within the EU to control how their personal information is collected and processed, it also places a range of obligations on organizations to be accountable for protecting a wide range of personal data. The GDPR considers any data related to an identified individual or any data that can be used to identify an individual as "personal" data. Personal data includes "an identifier such as a name, an identification number, location data, an online identifier or to one or more factors specific to the physical, physiological, genetic, mental, economic, cultural or social identity of an individual." Similarly, the GDPR places responsibility on organizations collecting or processing the regulated information. Even organizations based outside the EU that (1) offer goods or services to individuals in the EU, (2) monitor their behavior, or (3) process their personal data are subject to the GDPR.

Furthermore, the ePrivacy Directive (EU) 2016/680 and proposed Regulation were created to complement and particularize the GDPR to protect individuals' private lives by protecting their electronic communications data that qualify as personal data. The ePrivacy regulations specifically address unsolicited marketing, the use of cookies, and confidentiality. As a result, the ePrivacy regulations are commonly referred to as the "cookie law." The rules that require an individual's consent before using technologies, such as a cookie, to store or access information on computers, smartphone, tablets, or other smart device, are also commonly referred to as the "cookie rule."

The ePrivacy regulations require an individual's privacy to be protected at every stage of every online interaction. Specifically, cookies that can identify individuals via their devices are considered personal data; therefore, the owners of the websites using these cookies may be required to comply with the GDPR and the ePrivacy regulations. In the past, implied consent was sufficient to be compliant with the cookie rule, such as visiting a website that contains a notice of consent. Now these regulations require individuals to take a "clear affirmative action" to consent. Further, current regulations require organizations to provide each individual with the ability to easily withdraw their consent. Current consent rules and regulations also require explaining to the individual what personal data the website is collecting, and how the data will be processed and used.

Accompanying these strict requirements are strict penalties and potential fines. Organizations that violate these regulations will be subject to penalties up to 4% of global annual revenue, or €20 million, whichever is greater. To illustrate, a United States company that offers products on its website where the website is accessible to individuals within the EU is subject to the data protection and privacy regulations; therefore, the U.S. company may liable for violating these regulations. Internet Protocol (IP) addresses, cookie identifiers, e-mail addresses, or other online identifiers are considered personal data because a user may be associated with these identifiers. If a web site tracks any online identifiers or other personal data, the user must give informed consent and the data must be protected on the user's device.

Some prior art systems rely on tracking pixels as an alternative to tracking cookies, and may be used to track user activities. Tracking pixels consist of four main types: iFrame, JavaScript, Image, and Post-back. Like cookies, tracking pixels typically require server-side or customer/client-side code to collect information about the operating system or browser type used on the device, sometimes referred to as fingerprinting. Also, tracking pixels frequently store tracking information on the user's device, similar to the use of cookies. As such, the use of pixel-tracking invokes these heightened data privacy regulations as well.

To improve user tracking, multiple tracking systems (i.e., use of cookies, tracking pixels, hosted sites, behavioral tracking, and other tracking systems) are often combined resulting in additional complexity and increased likelihood of failure. Multiple systems, including tracking pixels, may be blocked by browsers and require compliance with the GDPR and the ePrivacy regulations. As a result, these tracking systems are becoming undesirable and/or obsolete, which impact techniques and models that depend on them, including attribution modeling, cross channel attribution, conversion attribution, behavioral tracking, cross session tracking, browser fingerprinting, and others.

Notwithstanding these recent regulations, organizations frequently collect, process and/or use data from consumers, including data obtained from websites, mobile applications and other Internet-enabled communications. This data includes personal data and is at risk of loss and potential exploitation, and in fact has been lost and/or exploited as shown in several high-profile data breaches. Due to these recent breaches of enterprise data protection schemes, consumers have low confidence in sharing data with various organizations. In turn, organizations actually or potentially impacted by a breach have incurred great expense to address these concerns.

It would therefore be advantageous to provide a system and method that is capable of tracking user information on an individual basis, that is compliant with GDPR and other regulations discussed above, that eliminates cookies, pixels or equivalent code, and that otherwise significantly reduces, if not eliminates, the shortcomings and problems noted above. Other advantages over the prior art will become known upon review of the Detailed Description and appended materials.

SUMMARY

With the foregoing in mind, the applicant has invented systems and methods for collecting information transmitted over a network which, among other things, overcome the disadvantages recited above. Various embodiments described herein broadly relate to systems and methods for protecting and enhancing enterprise communications and associated data.

In one aspect of the present disclosure, a system and method is disclosed that permits "cookieless" tracking across a wide range of websites and mobile applications.

In another aspect of the present disclosure, the systems and methods described herein are achieved without use of tracking pixels or code on associated servers. In another aspect of the present disclosure, the systems and methods are achieved without tracking pixels or code on individual web pages.

In yet another aspect of the present disclosure, a single URL is employed for tracking a user across multiple websites.

In another aspect of the present disclosure, systems and methods are disclosed for tracking user activity and information across sessions and otherwise provide cross channel and/or true conversion attribution.

Another aspect of the present disclosure relates to a system for establishing primary node placement for collecting and storing information. In embodiments, the system comprises a network, the network comprising a plurality of nodes, a primary node connected to the network that is capable of intercepting and transmitting information to another network location on the network, wherein the primary node is logically situated between a user device and a target site, and wherein the primary node is configured to (1) receive a published request for communication with the target site from the user device, (2) send an original transmission to the target site, wherein the original transmission is based on the published request received from the user device, (3) receive a return transmission from the target site, and (4) send the return transmission to the user device, wherein the primary node is capable of storing, at least temporarily, the original and return transmissions into a logical memory location.

In another aspect, the present disclosure relates to a system for exchanging information between an originator and a responder, comprising a network, a data collection system connected to the network, and a primary node connected to the network that is capable of transmitting information to the data collection system, wherein the data collection system is configured to collect and manage all transmissions sent to and from the originator and the responder, and wherein the data collection system is capable of (1) receiving a published request for transmission of data from the responder, (2) modifying the published request, (3) storing the modified published request, (4) sending a transmission to the responder with the modified published request, (5) receiving a return transmission from the responder, (6) modifying the return transmission, and (7) sending the return transmission to the originator.

Other aspects of the disclosure will become apparent after reviewing the Detailed Description and Figures appended hereto.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "machine-readable media" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a flexible disk, hard disk, magnetic tape, or any other magnetic medium, magneto-optical medium, a CD-ROM, any other optical medium, a RAM, a PROM, an EPROM, a FLASH-EPROM, a solid state medium like a memory card, any other memory chip or cartridge, or any other medium from which a computer or like machine can read.

When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute", and variations thereof, as used herein, are used interchangeably and include any type of methodology, process, mathematical operation or technique.

The term "module" as used herein refers to any known or later developed hardware, software, firmware, machine engine, artificial intelligence, fuzzy logic, or combination of hardware and software that is capable of performing the functionality associated with that element. Also, while the invention is described in terms of exemplary embodiments, it should be appreciated that individual aspects of the invention may be separately claimed.

This Summary is meant to be illustrative of the principles and various embodiments of the present disclosure. Numerous variations and modifications will become apparent to those skilled in the art once the full disclosure, including the drawing figures, are appreciated. This Summary is therefore intended to provide a general description of embodiments of the present disclosure, and it is to be expressly understood that the foregoing be interpreted to embrace all variations and modifications disclosed herein.

BRIEF DESCRIPTION OF THE DRAWINGS

These and other objects, features and advantages of the present disclosure will be apparent from a consideration of the following Detailed Description considered in conjunction with the drawing Figures, in which.

Figure 1:
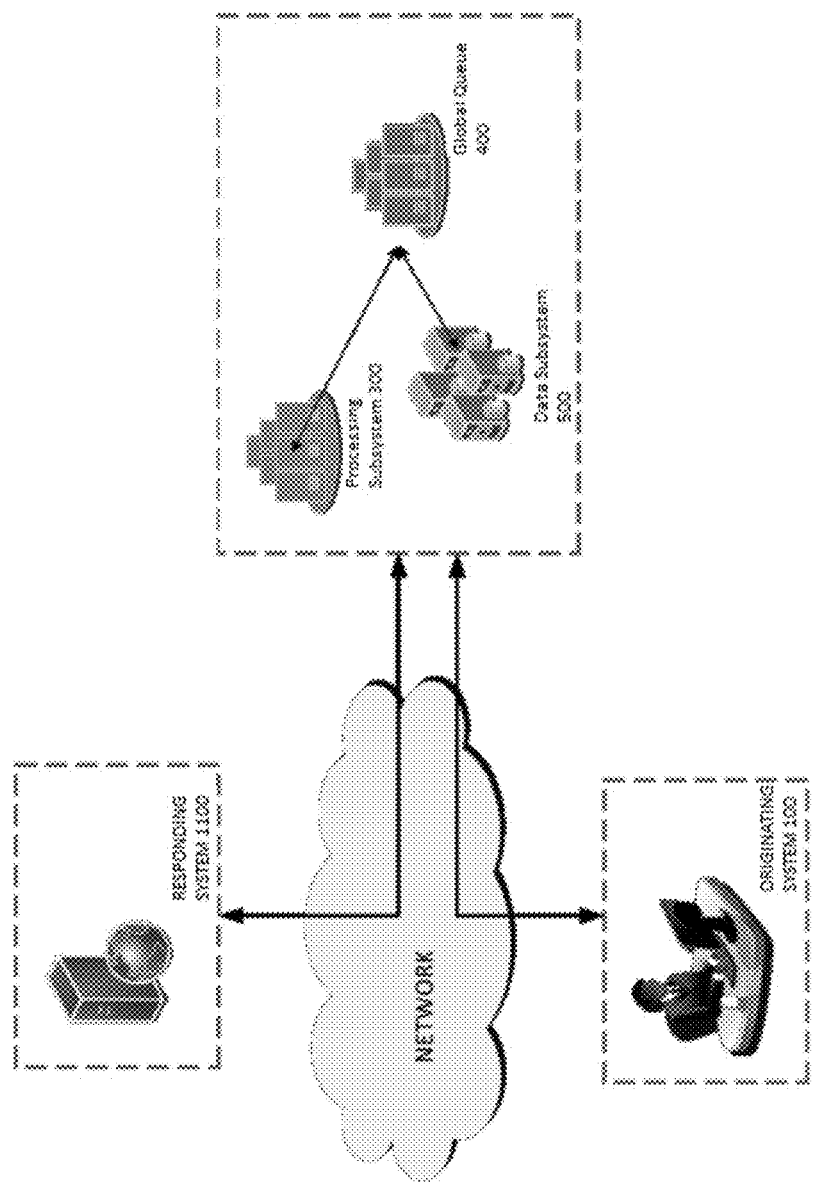
FIG. 1 illustrates a data collection system and network according to embodiments of the present disclosure.

It should be understood that, in certain instances, details that are not necessary for an understanding of the invention or that render other details difficult to perceive may have been omitted in the drawing Figures. It should be understood, of course, that the invention is not necessarily limited to the particular embodiments illustrated in the Figures, and includes all variations and modifications described herein.

DETAILED DESCRIPTION

The ensuing description provides embodiments only, and is not intended to limit the scope, applicability, or configuration of the claimed invention. Rather, the ensuing description will provide those skilled in the art with an enabling description for implementing the embodiments. It should be understood that various changes may be made in the function and arrangement of elements or steps without departing from the spirit and scope of the appended claims.

Furthermore, while embodiments of the present disclosure will be described in connection with various websites, it should be appreciated that embodiments of the present disclosure are not so limited. In particular, embodiments of the present disclosure may be applied to any collection of personal data via a network. For instance, while embodiments of the present invention may be described with respect to collection of consumer data obtained by visiting an organization's website, the scope of the inventions described herein are not so limited.

In one preferred embodiment, the system and methods described herein permit tracking user activity and information across sessions and otherwise provide cross channel and/or true conversion attribution. In another preferred embodiment, the system and method permits cookieless tracking across a wide range of websites, without the use of tracking pixels or code on associated servers or on individual web pages. In a preferred embodiment, only one URL is required to track across multiple websites.

Referring to FIGS. 1-5, preferred embodiments of the disclosure comprise a data collection system configurable to communicate with an originator system, which may act in the role of a responding system. The information sent from the originator system can be stored for subsequent use and then utilized to generate a request based on the context of the originating system request. The data collection system then acts in the role of the originator system and submits a request to the responding system via a network. The originating message (request) includes a first Universal Resource Indicator (URI) that can be used to determine the intermediate server, including but not limited to, a web server or a proxy server. The first URI can be used by the intermediate server to determine a second URI, the responding system URI, which may be based in part on dynamic URI mappings. The responding system can then return a response to the data collection system and this response can be both stored and used to generate a response back to the originator system. This information can then be utilized to support advanced user interaction analytics with monitored network-enabled sites.

In accordance with one preferred embodiment, sometimes referred to hereinafter as the DataTrendz™ system, there are provided herein methods and systems for tracking messages transmitted over a network. The ability of DataTrendz™ to interject processing directly into the request-response stream allows users to store and/or analyze both structure and function. Collecting this context-dependent data provides a user with significant insights that extend beyond existing tracking and reporting systems.

In one embodiment, the utility and functionality provided by DataTrendz™ is achievable for a network, such as the Internet, having a broad range of differing network locations. In this example network locations may include network servers, website servers, personal computers, mobile devices such as phones capable of accessing the Internet and a host of other network capable devices. However, DataTrendz™ also provides preferred functionality and utility to other networks such as private intranets, where the range of network locations may be more homogenous than that found on the Internet.

Implementation of the DataTrendz™ system can be made on any type of network, connecting virtually any type of network location to any other type of network location. In a preferred embodiment, this is accomplished without the use of cookies, pixels or code on associated servers or individual web pages.

For the purposes of promoting an understanding of the principles of the present disclosure, reference is made to the embodiments described herein and illustrated in the Figures, and specific language will be used to describe the same. It will nevertheless be understood that no limitation of the scope of the disclosure is intended thereby. Any alterations and further modification in the described processes, systems, or devices, and any further applications of the principles of the disclosure as described herein are contemplated as would normally occur to one skilled in the art to which the disclosure relates.

FIG. 1 includes an exemplary system and network for illustrating the principles of the inventions described herein. As depicted in FIG. 1, the system may comprise a Data Collection System 200. The data collection system manages messages sent to and from at least one Originator System 100 and the Responding System 1100. The data collection system may comprise a processing subsystem 300, a data subsystem 500, and a global queue (not shown in FIG. 1). The Data Collection System 200 preferably is configured to manage messages sent to and from the Originator System 100 and the Responding System 1100. Although the Responding System 1100 is shown as a server and the Originating System 100 is shown as an individual workstation, it is to be understood that of computational machinery may be configured to work with the systems and methods described herein, regardless of type, and including those presently available and those developed in the future.

In one embodiment of the invention, the network comprises the Internet in either a wired, wireless cellular or other medium. In another embodiment of the invention, the network is selected from the group comprising: local area network (LAN) and wide area network (WAN). The invention is not limited to implementation in any specific network configuration. Instead, it will find application in any type of system comprising interconnected computers configured to communicate with each other using electronically transmitted messages.

In a preferred embodiment, an Originator System 100 sends a request using a Domain Name Source (DNS) Uniform Resource Identifier (URI). This first URI is used to route messages from the Originator System 100 to the Data Collection System 200. This URI is provided as one example of locating external resources and is not intended to restrict the present disclosure.

The Data Collection System 200 receives the request from the Originator System 100, and processes the request to determine the destination URI, which may be based in part on dynamic URI mappings. The Data Collection System 200 then modifies or creates a new message based on the original request and sends the new request to the Responding System 1100. The Data Collection System 200 processes the response from the Responding System 1100 and modifies links and other data to point to the data collection system. As a user browses between webpages or websites, the Data Collection System 200 continues to act as an intermediary as messages flow between the Originator System 100 and one or more Responding Systems to allow continued message processing and message flow control.

In a preferred embodiment, a data collection system or "DataTrendz™ system" is configured to collect all information exchanged between the Originator System 100 and the Responding System 1100. In this manner, the DataTrendz™ system may serve as an intermediate web server and processes all requests for information between the Originator System 100 and the Responding System 1100. In turn, all user actions in-page are relayed back to the DataTrendz™ system using a DataTrendz™ system URI.

In embodiments, one or more devices on a network may comprise an application or "plug-in" that redirects network traffic to the DataTrendz™ system. The plug-in may be in addition to or in lieu of an intermediate data collection module or other Data Collection System 200 described herein. In another embodiment, network data may be intercepted or otherwise indirectly acquired and sent to the DataTrendz™ system. This may be accomplished by, for example, a series of gateways or routers (or equivalent hardware) configured to capture and redirect network data to the DataTrendz™ system.

According to one embodiment, requests may be routed by the DataTrendz™ system without changing or adding to the data. For example, the request may be passed through by the DataTrendz™ system, and then data header information may be modified or added to the response. This may be achieved, for example, while modifying the referrer http headers' attributes. Similarly, the response may be routed by the DataTrendz™ system, depending on the network and browser configuration.

In other embodiments, the DataTrendz™ system is configured to capture network data where a user has cached browsing content. This may be achieved by recognizing response intermediates or load-balancing that has occurred within a network, or by employing indirect data acquisition methodologies such as those described above.

Figure 2:
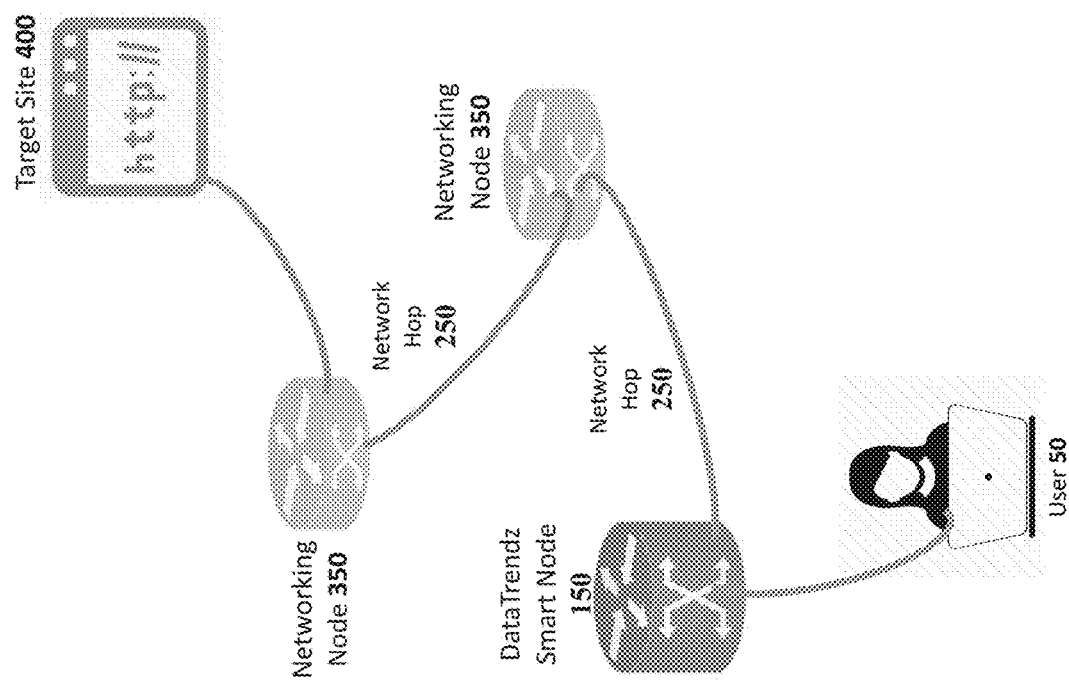
FIG. 2 illustrates a primary network node configuration according to embodiments of the present disclosure.

Referring now to FIG. 2, a diagram is shown illustrating one aspect of the present disclosure, wherein the DataTrendz™ system engages as the primary network node between a user 50 and a target site 400 for improved node tracking and routing of data as described herein. In this embodiment, a user 50 may connect or cause to become connected with a target site 400, typically via one or more networking nodes 350 and corresponding network "hops" 250. For instance, the user 50 may attempt to connect with a target site 400 by selecting a link http.//amazon.datattrendz.net. In a preferred embodiment, this selection triggers a Javascript request to the DataTrendz™ system, which in turn causes a domain redirect to occur, thereby bypassing the other networking nodes 350 and hops 250 and making the DataTrendz™ Smart Node 150 the primary networking node.

As shown in FIG. 2, all data communications flow through the DataTrendz™ Smart Node 150 while the user's 50 browser is open. Data communications routed through the DataTrendz™ Smart Node 150 includes all manual URL entries made by the user 50, as well as any selections of "favorites" by the user 50 and all on-page actions taken by the user 50. In this manner, by acting as an invisible proxy, the DataTrendz™ system becomes and remains the primary networking node throughout the browser session, and thereby controls the flow of communications between the user 50 and the target site 400.

In a preferred embodiment, the DataTrendz™ system may further comprise one or more filters to prevent capturing and/or storing certain file types or communication formats, including by way of example images, videos, protocol files, etc. In one embodiment, filters are optional and configurable by the user depending on the type of data and/or network and/or user preferences. In another embodiment, filters are pre-configured to avoid increased network traffic and storage requirements placed on the DataTrendz™ system. In one embodiment, filter are provided upstream of the Data-Trendz™ Smart Node 150, while in other embodiments filters are provided downstream of the DataTrendz™ Smart Node 150.

The DataTrendz™ system preferably comprises a logging function, whereby certain events may be captured in chronological or other format. This logging feature may be optional, and may permit a user or administrator to periodically audit the DataTrendz™ system for maintenance, troubleshooting, event diagnostics, etc. The logging function also permits various reporting functions to be scheduled or run spontaneously by a user or an administrator, on demand, for diagnosing communications.

In a preferred embodiment, a user can access all data collected by DataTrendz™ through their own website, which may be audited and analyzed by the user in real-time or substantially real-time. One or more user interface may be provided with the DataTrendz™ systems to facilitate reporting, auditing, logging, routing and other functionality described herein.

The systems and methods described herein may be used with a variety of scalable architectures and/or hierarchies. For example, DataTrendz™ can support multiple data sources/structures, including by way of example, MySQL, MS SQL Server, Rabbit and Zero MQ. DataTrendz™ can also be configured to share information across multiple servers and share data by local port forwarding. Similarly, data can be viewed and analyzed across a highly distributed system, and exemplary records for the systems and methods described herein may contain complete, roundtrip transmission data, including complete DOM object, complete HTTP packages, data types, as well as any dynamically submitted information.

The DataTrendz™ system may be implemented in a cloud computing environment. In this embodiment, requests that are received by the system can be mirrored in a unique thread and associated with any response and modification as required by the system, including subsequent requests. This data may be passed through by the DataTrendz™ system or stored in the cloud, or a combination of both. As with the embodiments described above, one or more filters may be applied to prevent cloud storage of undesired data or file types.

Figure 3:
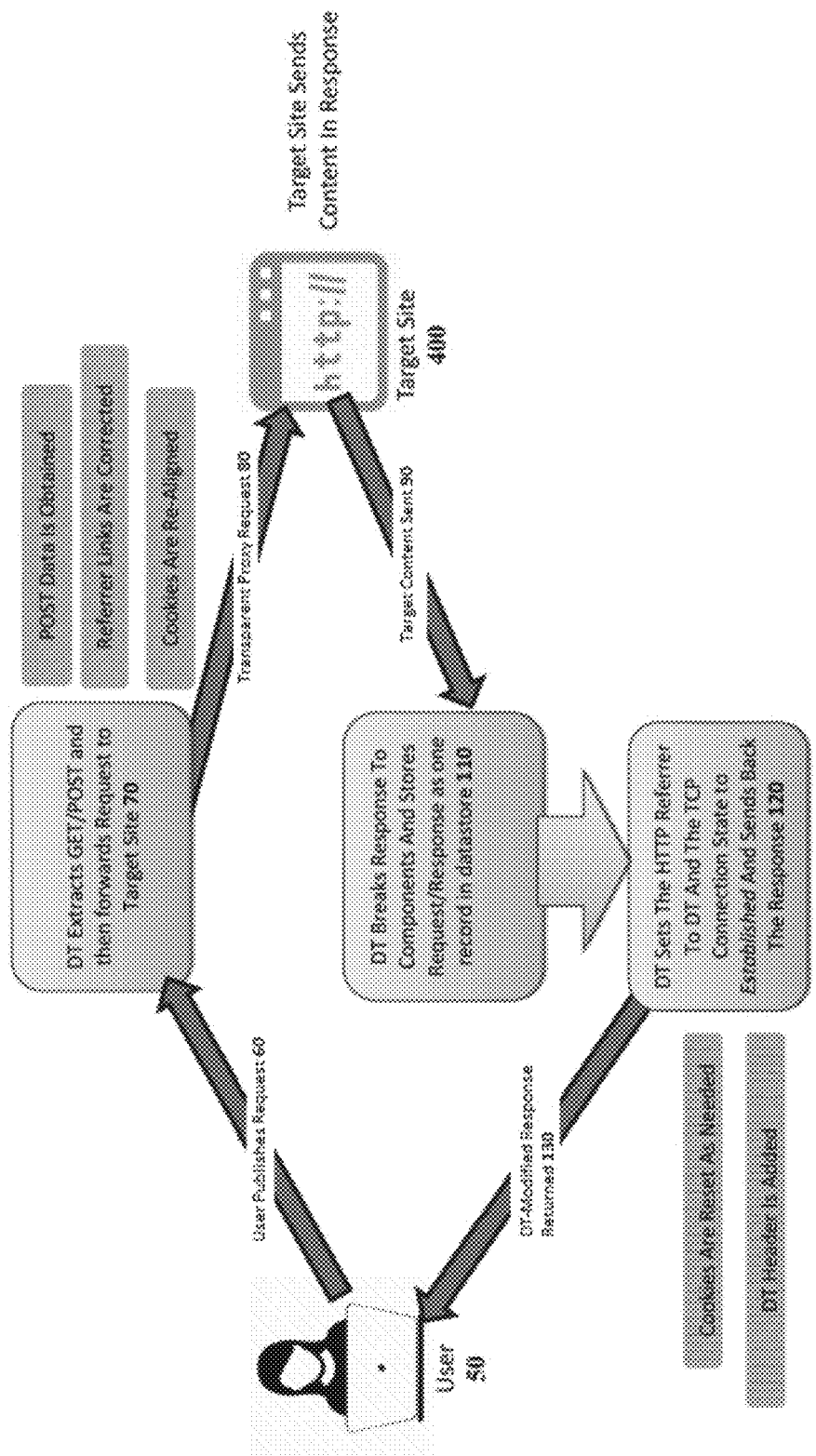
FIG. 3 is a schematic diagram illustrating a process for handling a connection between a user and a target site according to embodiments of the present disclosure.

The DataTrendz™ system provides numerous benefits with respect to handling a connection between a user and a target site, as well as managing the data flow between the two. Referring now to FIG. 3, an illustration of one embodiment of the present disclosure is shown in a series of steps. According to this embodiment, a user 50 may request content from a target site 400, including by publishing a request 60 to the DataTrendz™ system. Upon making the request 60, the DataTrendz™ system extracts the GET/POST data and forwards the request 70 to the target site 400. In this step, or before or after this step, several subprocesses may occur. For example, POST data may be obtained, extracted and/or filtered. In addition, referrer links may be inspected and corrected, if necessary. And finally, cookies (if any) may be re-aligned as described in greater detail herein. Next, the DataTrendz™ system sends a transparent proxy request 80 to the target site 400.

Several actions may occur on the target site, eventually leading to the target site 400 sending content 90 per the user's request 60 and the transparent proxy request 80. The DataTrendz™ system then breaks down the target site content into one or more components and stores the request and response in the datastore 110, preferably as a single record. Next, the DataTrendz™ system sets the http referrer to DataTrendz™ and makes the TCP connection state "established" and sends back the response 120 to the user 50. Thus, the DataTrendz™ system transmits a modified response 130 to the user, which may entail any cookies being reset, and/or a unique DataTrendz™ header added to the modified response and record.

Figure 4A:
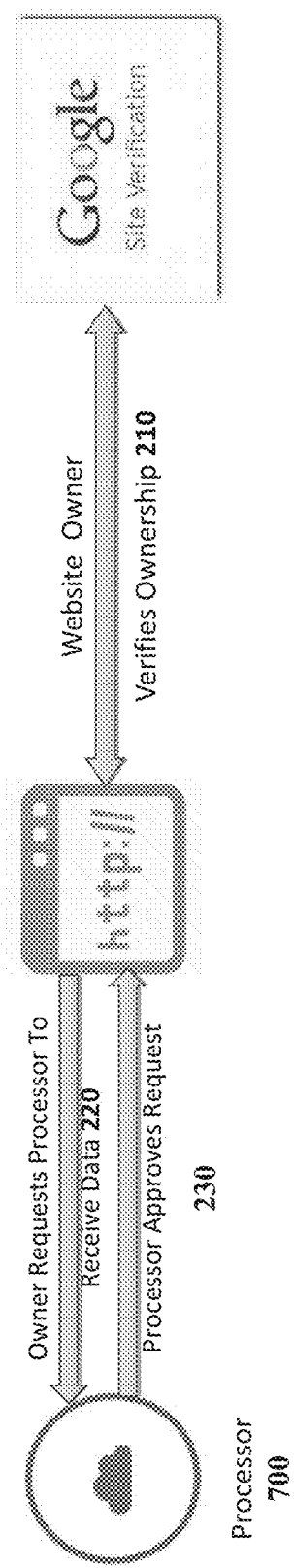
FIG. 4A is a schematic diagram illustrating a website owner or operator driven request for data according to embodiments of the present disclosure.
Figure 4B:
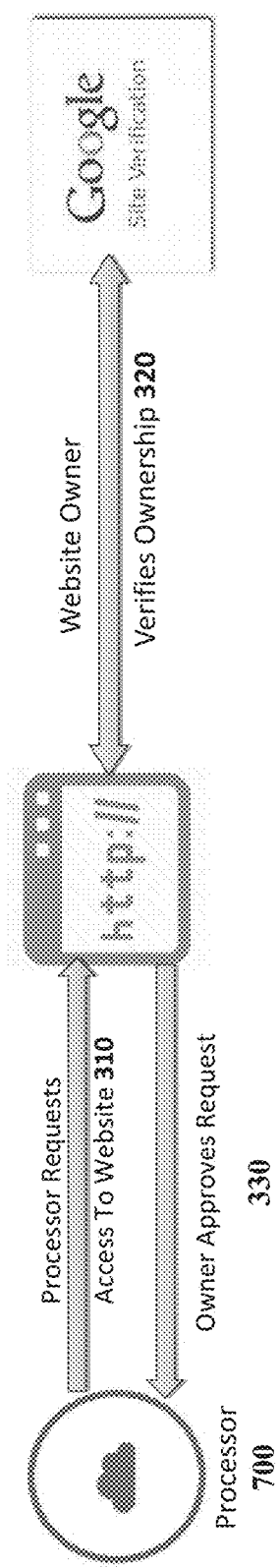
FIG. 4B is a schematic diagram illustrating a processor driven request for access to a target site according to embodiments of the present disclosure.

The DataTrendz™ system may be provided as Data as a Service. Referring now to FIGS. 4A-4B, Data as a Service may be configured to route roundtrip records, without permanently storing the original data. FIGS. 4A-4B depict these processes as a series of steps, although in embodiments not all steps or processes shown are required to appreciate the benefits of the inventions claimed herein.

Referring in detail to FIG. 4A, the DataTrendz™ system described herein may be invoked by a website owner verifying ownership 210 of content data from the website. Then, the owner may request a processor 700 to receive the data 220. Next, the processor, once authorized, approves the request 230. Alternatively, the processor 700 may request access to the website owner's website 310, triggering the website owner to verify ownership 320. Once verified and authorized, the owner may approve the request 330 and transmit the approval to the processor 700. The Data-Trendz™ system may therefore be offered as a service between a website owner(s) and processor(s). As described in greater detail in connection with FIG. 5, these systems and methods may apply to multiple website owners and multiple processors.

In certain embodiments, data is captured from these records to create unique identifiers, such as for event logging and/or billing purposes. In this manner, the DataTrendz™ system avoids acting as a data repository or data processor, and thereby route records more efficiently.

Figure 5:
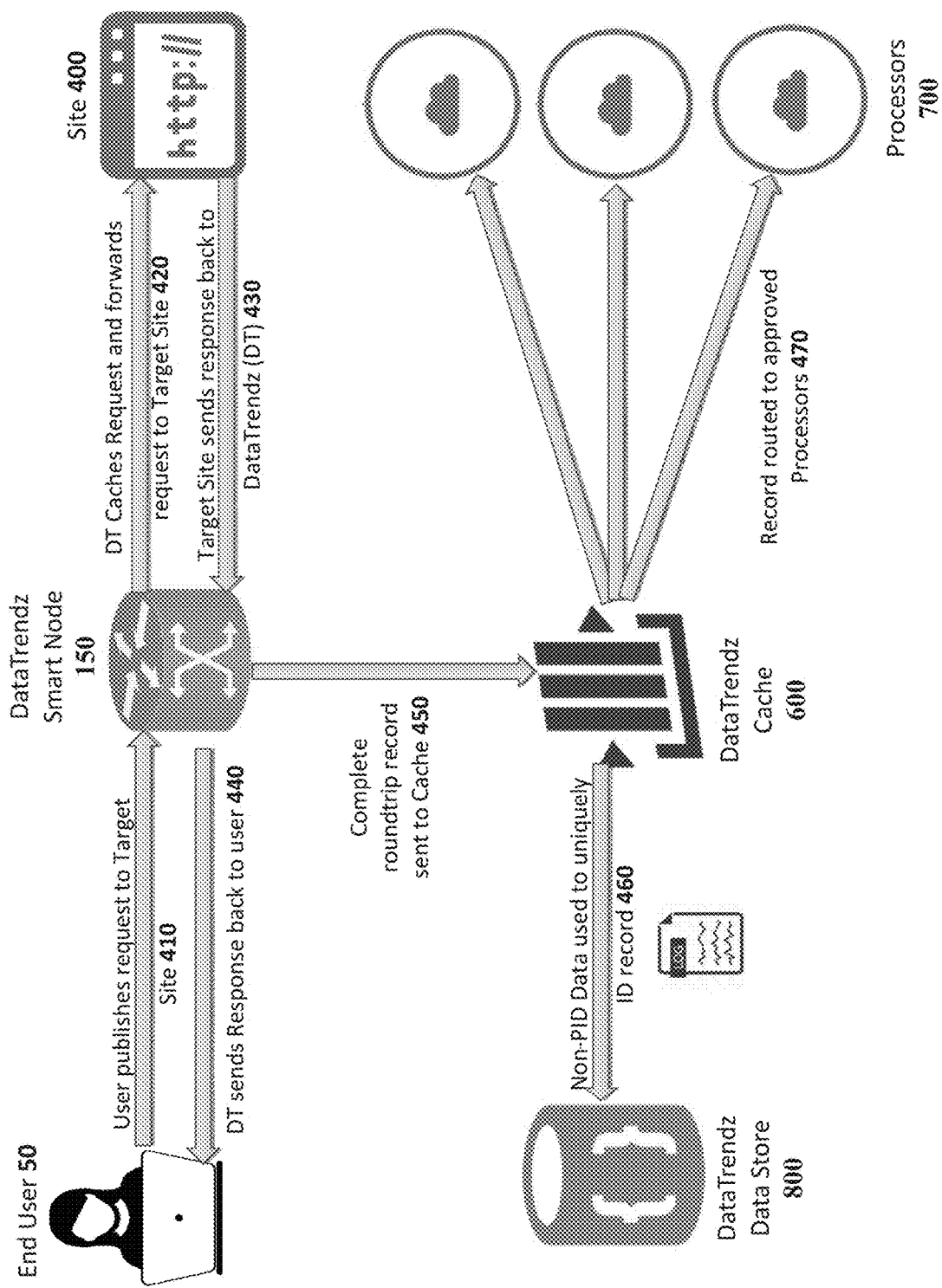
FIG. 5 is a schematic diagram illustrating steps involved with collection and processing of data according to embodiments of the present disclosure.

Services provided by the DataTrendz™ system may be more complex and include services beyond registration/verification of data processing, as described in relation to FIGS. 4A and 4B. For instance, and as shown in FIG. 5, services may entail collection of data for facilitating communications between a user and a target site. In embodiments, the user 50 may publish a request 410 to the target site 400. As described above, the DataTrendz™ system may act in the capacity of a primary networking node, by way of a DataTrendz™ Smart Node 150. Thus, the DataTrendz™ Smart Node 150 may receive the published request from the user 50 and cache the request and forward the request 420 to the target site 400. Next, the target site 400 sends a response 430 back to the DataTrendz™ Smart Node 150 authorizing the requested content from the target site 400. Here, this sequence triggers a further caching of the record 450 and storage of the same in a DataTrendz™ Cache repository 600. Next, the record(s) may be routed 470 to approved processor(s) 700. Once routed 470, the record may be permanently removed from the DataTrendz™ Cache 600. Once completed, non-PID data may be used to uniquely create and store a record ID 460, which is sent to the DataTrendz™ Data Store 800. These records permit the reporting and auditing functions described herein. The process described and shown in FIG. 5 may be repeated for multiple web sites and user published requests, and may entail different processors depending on the requested data. In other embodiments, fewer than all of the steps and elements shown in FIG. 5 are required to complete the data collection process described above.

According to embodiments, the applications described above are preferably configured to run on a computer server or similar computational machinery, referred to in the following paragraphs as a computing environment. The computing environment preferably includes one or more user computers. The computers may be general purpose personal computers (including, merely by way of example, personal computers, and/or laptop computers running various versions of Microsoft Corp.'s Windows operating systems) and/or workstation computers running any of a variety of commercially-available UNIX or UNIX-like operating systems. These user computers may also have any of a variety of applications, including for example, database client and/or server applications, and web browser applications. Alternatively, the user computers may be any other electronic device, such as a thin-client computer, Internet-enabled mobile telephone, and/or personal digital assistant, capable of communicating via a network and/or displaying and navigating web pages or other types of electronic documents. Any number of user computers may be supported.

The computing environment described according to this embodiment preferably includes at least one network. The network can be any type of network familiar to those skilled in the art that can support data communications using any of a variety of commercially-available protocols, including without limitation SIP, TCP/IP, SNA, IPX, AppleTalk, and the like. Merely by way of example, the network maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system in varying embodiments may also include one or more server computers. One server may be a web server, which may be used to process requests for web pages or other electronic documents from user computers. The web server can be running an operating system including any of those discussed above, as well as any commercially-available server operating systems. The web server can also run a variety of server applications, including SIP servers, HTTP servers, FTP servers, CGI servers, database servers, Java servers, and the like. In some instances, the web server may publish operations available operations as one or more web services.

According to certain embodiments, the computing environment may also include one or more file and or/application servers, which can, in addition to an operating system, include one or more applications accessible by a client running on one or more of the user computers. The server(s) may be one or more general purpose computers capable of executing programs or scripts in response to the user computers. As one example, the server may execute one or more web applications. The web application may be implemented as one or more scripts or programs written in any programming language, such as Java™, C, C #, or C++, and/or any scripting language, such as Perl, Python, or TCL, as well as combinations of any programming/scripting languages. The application server(s) may also include database servers, including without limitation those commercially available from Oracle, Microsoft, Sybase™ IBM™ and the like, which can process requests from database clients running on a user computer.

In embodiments, the web pages created by the application server may be forwarded to a user computer via a web server. Similarly, the web server may be able to receive web page requests, web services invocations, and/or input data from a user computer and can forward the web page requests and/or input data to the web application server. In further embodiments, the server may function as a file server. Although the foregoing generally describes a separate web server and file/application server, those skilled in the art will recognize that the functions described with respect to servers may be performed by a single server and/or a plurality of specialized servers, depending on implementation-specific needs and parameters. The computer systems, file server and/or application server may function as an active host and/or a standby host.

In embodiments, the computing environment may also include a database. The database may reside in a variety of locations. By way of example, database may reside on a storage medium local to (and/or resident in) one or more of the computers. Alternatively, it may be remote from any or all of the computers, and in communication (e.g., via the network) with one or more of these. In a particular embodiment, the database may reside in a storage-area network ("SAN") familiar to those skilled in the art. Similarly, any necessary files for performing the functions attributed to the computers may be stored locally on the respective computer and/or remotely, as appropriate. In one set of embodiments, the database may be a relational database, which is adapted to store, update, and retrieve data in response to SQL-formatted commands.

The computer system, in varying embodiments, may comprise software elements, including but not limited to application code, within a working memory, including an operating system and/or other code. It should be appreciated that alternate embodiments of a computer system may have numerous variations from that described above. For example, customized hardware might also be used and/or particular elements might be implemented in hardware, software (including portable software, such as applets), or both. Further, connection to other computing devices such as network input/output devices may be employed.

According to one embodiment, the server may include one or more components that may represent separate computer systems or electrical components or may software executed on a computer system. These components include a load balancer, one or more web servers, a database server, and/or a database. The load balancer is operable to receive a communication from the mobile device and can determine to which web server to send the communication. Thus, the load balancer can manage, based on the usage metrics of the web servers, which web server will receive incoming communications. Once a communication session is assigned to a web server, the load balancer may not receive further communications. However, the load balancer may be able to redistribute load amongst the web servers if one or more web servers become overloaded.

In embodiments, the systems and methods described herein may apply to an application operated on a user's mobile device. In embodiments, the application may comprise one or more user interfaces and displays. The application may be stored or operated on a computing environment, wherein the systems, devices, servers, modules, etc. may execute.

In embodiments, one or more web servers are operable to provide web services to the user devices. In embodiments, the web server receives data or requests for data and communicates with the database server to store or retrieve the data. As such, the web server functions as the intermediary to put the data in the database into a usable form for the user devices. There may be more or fewer web servers, as desired by the operator.

In embodiments, a database server is any hardware and/or software operable to communicate with the database and to manage the data within the database. Database servers, for example, SQL server, are well known in the art and will not be explained further herein. The database can be any storage mechanism, whether hardware and/or software, for storing and retrieving data. The database can be as described further herein.

In embodiments, components of the web server can include hardware and/or software components. In embodiments, the web server includes a discovery web service. In certain embodiments, a discovery web service may be responsible for extracting information from a user (i.e., the user's name, a user's device identifier, a cell phone number, an Internet Protocol (IP) address, etc.) or other user identifying information. In this scenario, the information may be compared to a stored table or other data to match the user device to an assigned web server. If the device is assigned to the web server, the request is passed to the device interface. However, if the user device is mapped to another web server, the discovery web service can redirect the request and the mobile device by replying to the request with a redirect message that includes the uniform resource locator (URL) for the other web server. In this way, the system is expandable, as new web servers can be easily added as new enterprises/users access the system.

In the foregoing description, for the purposes of illustration, systems and methods were described in a particular order. It should be appreciated that in alternate embodiments, the methods may be performed in a different order than that described.

It should also be appreciated that the methods described above may be performed by hardware components or may be embodied in sequences of executable instructions on machine-readable media, and which cause a machine, such as a general-purpose or special-purpose processor or logic circuits programmed with the instructions to perform the methods. These machine-executable instructions may be stored on one or more machine-readable mediums, such as CD-ROMs or other type of optical disks, diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, elements may be displayed in certain diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for collecting and storing information, comprising:
    establishing a network;
    connecting at least one primary node to the network;
    configuring the at least one primary node to transmit information between at least one target location on the network and at least one user location on the network;
    receiving, by the at least one primary node, a published request for communication between the at least one target location and the at least one user location on the network;
    sending, by the least one primary node, an original transmission to the at least one target location, wherein the original transmission is based on the published request received from the at least one user location;
    receiving a return transmission from the at least one target location;
    sending the return transmission to the at least one user location;
    storing, at least temporarily, the original and return transmissions into a logical memory location, wherein the original and return transmissions are devoid of cookies and tracking pixels.

2. The method of claim 1 further comprising the steps of correcting any referrer links associated with the original or return transmissions.

3. The method of claim 1, wherein the at least one primary node is further configured to intercept and collect all information exchanged between the at least one user location and the at least one target location.

4. The method of claim 1 further comprising the step of filtering communications between the at least one user location and the at least one target location to prevent collecting certain file types or communication formats.

5. The method of claim 4, wherein the filtering step prevents collecting image, video, and protocol file types.

6. The method of claim 1, wherein the at least one primary node is further configured to cache the published request received from the at least one user location and the return transmission from the at least one target location.

7. The method of claim 1, wherein at least a portion of the transmission to the at least one target location is modified to manage further transmissions between the at least one user location and the at least one target location.

8. The method of claim 7, wherein the at least one primary node is further configured to intercept transmissions initiated by selection of one or more hyperlinks.

9. The method of claim 1, wherein the network is connected to a processing subsystem, a data subsystem, and a global queue.

10. The method of claim 1, wherein all transmissions are routed through a distinct URI value.

11. The method of claim 10, wherein the distinct URI value contains a unique value to identify a transmission requests.

12. The method of claim 1, wherein transmissions are directed utilizing DNS entries.

13. The method of claim 1, wherein the network is selected from the group consisting of a local area network, a wide area network, an intranet and an Internet.

14. The method of claim 1, wherein the primary node is logically situated between the at least one user location and the at least one target location.

\* \* \* \* \*